United States Patent [19]

Kozakai et al.

[11] Patent Number: 4,492,414
[45] Date of Patent: Jan. 8, 1985

[54] REGULATOR VALVE FOR HYDRAULIC ANTI-SKID APPARATUS

[75] Inventors: Asao Kozakai, Anjo; Shingo Watanabe; Nobuyasu Nakanishi, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 498,855

[22] Filed: May 27, 1983

[30] Foreign Application Priority Data

Jun. 23, 1982 [JP] Japan .................... 57-109013

[51] Int. Cl.³ .............................................. B60T 8/02
[52] U.S. Cl. .................................... 303/116; 303/10; 303/11; 303/11 S
[58] Field of Search ............... 303/92, 116, 10, 11, 303/115, 86, 59, 66; 137/599

[56] References Cited

U.S. PATENT DOCUMENTS

| | | | |
|---|---|---|---|
| 3,905,654 | 9/1975 | Tribe | 303/115 |
| 3,922,021 | 11/1975 | Every | 303/116 |
| 4,188,074 | 2/1980 | Yama et al. | 303/92 |
| 4,355,849 | 10/1982 | Wilson | 303/116 |

Primary Examiner—Bruce H. Stoner, Jr.
Assistant Examiner—Alvin Oberley
Attorney, Agent, or Firm—Oblon, Fisher, Spivak, McClelland & Maier

[57] ABSTRACT

A regulator valve for a hydraulic anti-skid apparatus, in which a first valve member in the form of a piston is reciprocable within a housing for the regulator valve and subdivides the interior of the housing into first and second chambers arranged to be respectively applied with a hydraulic power pressure from a fluid pump and a master cylinder pressure from a master cylinder, the first valve member being formed at its one end with a valve part exposed within the first chamber, and in which a second annular valve member is arranged in the first chamber coaxially with the first valve member and is formed at its one end with a first small diameter valve part cooperating with the valve part of the first valve member to form a first annular throttle for throttling the fluid flow from the pump to a fluid reservoir through the first chamber and at its other end with a second large diameter valve part cooperating with the inner end wall of the first chamber to form a second annular throttle for throttling the fluid flow after the first annular throttle is closed, the second valve member being resiliently loaded by a spring toward the inner end wall of the first chamber.

3 Claims, 3 Drawing Figures

REGULATOR VALVE FOR HYDRAULIC ANTI-SKID APPARATUS

BACKGROUND OF THE INVENTION

The present invention relates to a regulator valve for a hydraulic anti-skid apparatus for installation in a vehicle braking system between a master cylinder and a wheel brake cylinder to prevent the road wheels from locking in braking operation, and more particularly to a regulator valve arranged to control a hydraulic power pressure applied to the anti-skid apparatus from a hydraulic power pressure source in response to a master cylinder pressure from the master cylinder.

Such a conventional hydraulic anti-skid apparatus as described above includes a cut-off valve disposed within a braking circuit connecting a master cylinder to rear wheel brake cylinders, a bypass valve disposed within a bypass passage or circuit of the braking circuit, and first and second differential pistons respectively arranged to control opening and closing operations of the cut-off valve and the bypass valve. The first differential piston is applied at its small diameter portion with a master cylinder pressure from the master cylinder and at its large diameter portion with a hydraulic power pressure from a hydraulic power pressure source in the form of a fluid pump by way of a solenoid valve. The solenoid valve is arranged to apply the hydraulic power pressure to the large diameter portion of the first differential piston under its deenergized condition. When energized in response to an electric signal from a computer in connection to a wheel lock sensor, the solenoid valve acts to connect the large diameter portion of the first differential piston to a fluid reservoir. Thus, the first differential piston acts to normally open the cut-off valve during deenergization of the solenoid valve. When connected to the fluid reservoir in response to energization of the solenoid valve, the first differential piston is displaced by the master cylinder pressure to close the cut-off valve and subsequently to increase a capacity downstream the cut-off valve thereby to decrease the pressure in the rear wheel brake cylinders.

The second differential piston is applied at its small diameter portion with the master cylinder pressure and at its large diameter portion with the hydraulic power pressure directly. Thus, the second differential piston acts to normally close the bypass valve under the hydraulic power pressure applied thereto and to permit the flow of fluid from the master cylinder to the rear wheel brake cylinders through the cut-off valve. When the hydraulic power pressure decreases below a predetermined value due to damage of the fluid pump, the second differential piston is displaced by the master cylinder pressure to open the bypass valve so as to directly apply the master cylinder pressure to the rear wheel brake cylinders. In the above-described arrangement, it is required to maintain the hydraulic power pressure at a relatively high value under inoperative condition of the master cylinder in order to avoid an error in operation of the bypass valve due to delay of increase of the hydraulic power pressure relative to increase of the master cylinder pressure. This results in fuel consumption in operation of a prime mover of the vehicle and results in decrease of durability of sealing members assembled within the anti-skid apparatus.

SUMMARY OF THE INVENTION

It is, therefore, a primary object of the present invention to provide an improved regulator valve which is capable of maintaining the hydraulic power pressure at a low value or a back pressure under inoperative condition of the master cylinder and rapidly increasing the hydraulic power pressure to a first predetermined value at a first increasing ratio in response to increase of the master cylinder pressure and capable of further increasing the hydraulic power pressure in response to further increase of the master cylinder pressure at an increasing ratio less than the first increasing ratio.

According to the present invention, the primary object is accomplished by provision of a regulator valve for a hydraulic anti-skid apparatus for installation in a vehicle braking system between a master cylinder and a wheel brake cylinder, which regulator valve comprises a housing provided with first and second inlet ports respectively for connection to a hydraulic power pressure source and the master cylinder and with first and second outlet ports respectively for connection to a fluid reservoir and the anti-skid apparatus and a first valve member in the form of a piston reciprocable within an axial bore in the housing and subdividing the interior of the housing into a first chamber in open communication with the first inlet and outlet ports and the second outlet port and a second chamber in open communication with the second inlet port, the first valve member being formed at one end thereof with a valve part exposed in the first chamber. The regulator valve further comprises a second annular valve member arranged in the first chamber coaxially with the first valve member, the second valve member being formed at one end thereof with a first valve part in a small diameter cooperating with the valve part of the first valve member to form a first annular throttle for throttling the flow of fluid from the first inlet port to the first outlet port and at the other end thereof with a second valve part in a large diameter cooperating with the inner end wall of the first chamber to form a second annular throttle for throttling the flow of fluid from the first inlet port to the first outlet port after the first throttle is closed, and resilient means for biasing the second annular valve member toward the inner end wall of the first chamber to restrict the movement of the second annular valve member toward the first valve member until a hydraulic power pressure from the pressure source reaches a predetermined value.

In operation of the above-described regulator valve, the first annular throttle does not act under inoperative condition of the master cylinder to maintain the hydraulic power pressure at a low value or a back pressure. This results in considerable decrease of the fuel consumption in operation of a prime mover of the vehicle and enhancement of the durability of sealing members in the anti-skid apparatus. When the master cylinder pressure increases up to a predetermined value, the first annular throttle acts to throttle the flow of fluid from the first inlet port to the first outlet port so as to rapidly increase the hydraulic power pressure up to a predetermined value at a first increasing ratio. When the master cylinder pressure further increases over the predetermined value, the second annular valve member abuts against the valve part of the first valve member to close the first annular throttle and moves unitedly with the same to effect the second annular throttle so as to further increase the hydraulic power pressure at a second increasing ratio less than the first increasing ratio. As a result, an error in operation of the bypass valve is reliably prevented.

BRIEF DESCRIPTION OF THE DRAWINGS

Additional objects and advantages of the present invention will become apparent from the following detailed description of a preferred embodiment thereof when taken together with the accompanying drawings in which.

DETAILED DESCRIPTION OF THE PREFERRED EMBODIMENT

Figure 1:
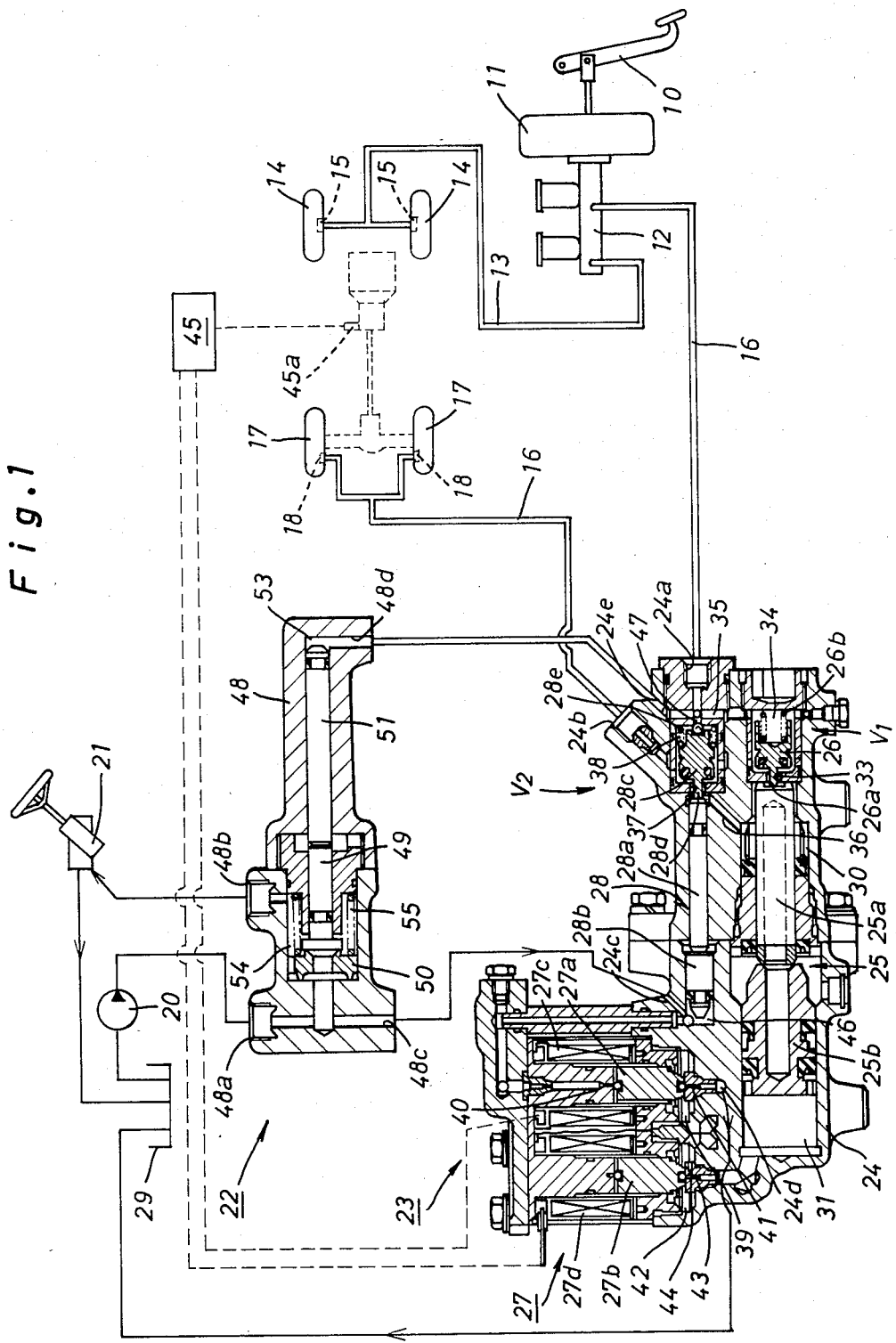
FIG. 1 illustrates a view in logitudinal section of a regulator valve in accordance with the present invention, which is incorporated in a vehicle braking system equipped with a hydraulic anti-skid apparatus.

In FIG. 1 of the drawings there is illustrated a vehicle braking system in which a hydraulic anti-skid apparatus 23 is disposed within a braking circuit 16 connecting a tandem master cylinder 12 to rear wheel brake cylinders 18, 18 to prevent lock of the rear road wheels 17, 17 in braking operation and in which a regulator valve 22 is connected to the braking circuit 16 to control a hydraulic power pressure applied to the anti-skid apparatus 23 from a fluid pump 20 in response to a master cylinder pressure from the master cylinder 12. The master cylinder 12 is equipped with a brake booster 11 which is arranged to be actuated by depression of a brake pedal 10, and the master cylinder 12 is directly connected to front wheel brake cylinders 15, 15 by way of a front braking circuit 13. The fluid pump 20 is arranged to be driven by a prime mover of the vehicle and is connected at its inlet port to a fluid reservoir 29 and at its outlet port to a power steering device 21 and the anti-skid apparatus 23 through the regulator valve 22.

The anti-skid apparatus 23 includes a housing 24 provided with inlet ports 24a, 24c, an outlet port 24b, a drain port 24d and a communication port 24e. The housing 24 is provided thereon with a solenoid valve assembly 27 and therein with a cut-off valve $V_1$, a bypass valve $V_2$, and first and second differential piston assemblies 25, 28 arranged in parallel. The inlet ports 24a and 24c of housing 24 are respectively connected to the master cylinder 12 through circuit 16 and to the regulator valve 22. The outlet and communication ports 24b, 24e of housing 24 are respectively connected to the rear wheel brake cylinders 18, 18 and to the regulator valve 22, and the drain port 24d of housing 24 is connected to the fluid reservoir 29.

The first differential piston assembly 25 includes a small diameter piston 25a and a large diameter piston 25b which are reciprocable in an axial bore of housing 24 and connected to each other. The small diameter piston 25a is exposed in a braking pressure chamber 30, while the large diameter piston 25b is exposed in a power pressure chamber 31 at its one end. The braking pressure chamber 30 is in communication with the inlet port 24a via an axial hole 33, a chamber 34 and a passage 35 and in communication with the outlet port 24b via a passage 36, an axial hole 37, and a chamber 38. The second differential piston assembly 28 includes a small diameter piston 28a and a large diameter piston 28b which are reciprocable in an axial bore of housing 24 and in abutment with each other at their inner ends. The small diameter piston 28a is exposed at its outer end in the braking pressure chamber 30 through passage 36, while the large diameter piston 28b is exposed at its outer end in a power pressure chamber 46 in open communication with inlet port 24c.

The cut-off valve $V_1$ is located in chamber 34 and includes a valve member 26 provided with an axial rod 26a, and a compression coil spring 26b loading the valve member 26 toward the small diameter piston 25a. The axial rod 26a of valve member 26 is in abutment with the small diameter piston 25a under a power pressure in chamber 31 to normally permit the flow of fluid from inlet port 24a to chamber 30 through chamber 34 and axial hole 33. When the first differential piston assembly 25 displaces leftwards in the figure, the valve member 26 closes the axial hole 33 to interrupt the flow of fluid from inlet port 24a to chamber 30. The bypass valve $V_2$ is located in chamber 38 and includes a valve member 28c provided with an axial rod 28d, and a compression coil spring 28e loading the valve member 28c toward the small diameter piston 28a. The axial rod 28d of valve member 28c is in abutment with the small diameter piston 28a under a hydraulic power pressure in chamber 46 to normally close an axial hole 47 in open communication with the inlet port 24a and to open the axial hole 37 in order to permit the flow of fluid from chamber 30 to outlet port 24b. If the hydraulic power pressure in chamber 46 decreases a zero value due to damage of the fluid pump 20, the second differential piston assembly 28 will displace leftwards under the master cylinder pressure, and the valve member 28c will close the axial hole 37 and open the axial hole 47 to permit the direct flow of fluid from inlet port 24a to outlet port 24b through chamber 38.

The solenoid valve assembly 27 includes first and second valve plungers 27a and 27b which are respectively loaded downwards by a coil spring, and first and second solenoid windings 27c and 27d which act to move the respective valve plungers 27a, 27b upwards upon energization thereof. During deenergization of the first solenoid winding 27c, the first valve plunger 27a is in its downward position to communicate the inlet port 24c to a chamber 39 via an orifice 40 and to close an orifice 41 in open communication with drain port 24d. When the first valve plunger 27a is moved upwards in response to energization of the first solenoid winding 27c, the chamber 39 is isolated from the orifice 40 and connected to the drain port 24d through orifice 41. During deenergization of the second solenoid winding 27d, the second valve plunger 27b is in its downward position to communicate the hydraulic power pressure chamber 31 to a chamber 42 in open communication with chamber 39 through an orifice 43 and to close an orifice 44. When the second valve plunger 27d is moved upwards in response to energization of the second solenoid winding 27d, the chamber 42 is connected to the power pressure chamber 31 through both orifices 43 and 44. Both the solenoid windings 27c and 27d are electrically connected to a computer 45 which is connected to a wheel lock sensor 45a to produce an output signal therefrom in response to an electric signal from sensor 45a. The sensor 45a is mounted on a transmission of the vehicle to detect rotation of an output shaft of the transmission so as to produce the electric signal therefrom in response to lock of the rear road wheels 17, 17. When lock of the rear road wheels 17, 17 is detected by sensor 45a, both the solenoid windings 27c and 27d are energized by the output signal from computer 45 to effect the anti-skid apparatus 23. When it is required to further apply the braking pressure to the rear wheel brake cylinders 18, 18, at least the first solenoid winding 27c is deenergized in response to disappear of the output signal from computer 45, and subsequently the second solenoid winding 27d is selectively deenergized.

Figure 2:
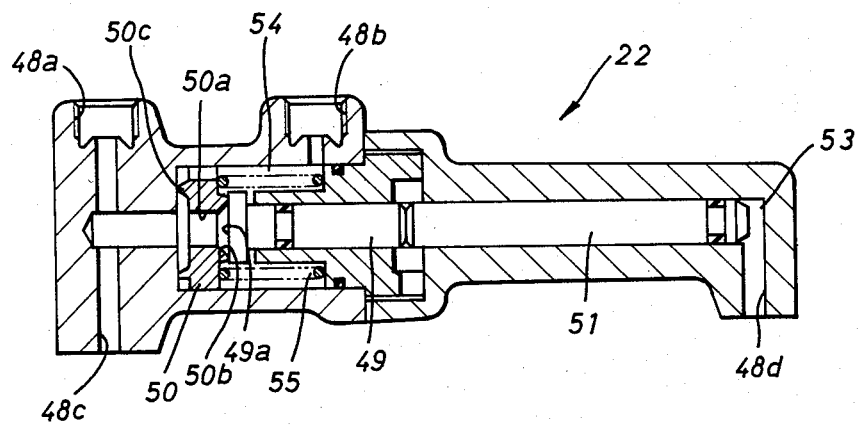
FIG. 2 is an enlarged sectional view showing a main portion of the regulator valve.

The regulator valve 22 comprises a housing 48 which is provided with first and second inlet ports 48a, 48d respectively in connection to the fluid pump 20 and to the master cylinder 12 via ports 24e, 24a of the anti-skid apparatus 23. The housing 48 is further provided with first and second outlet ports 48b, 48c respectively in connection to the power steering device 21 and to the inlet port 24c of anti-skid apparatus 23. Assembled within an axial bore in housing 48 are a first valve member 49 in the form of a piston, a second annular valve member 50, and an assistant piston 51 which are assembled coaxially. The pistons 49 and 51 are axially reciprocable and subdivide the interior of housing 48 into first and second chambers 54 and 53, the former chamber 54 being in open communication with the first inlet and outlet ports 48a, 48b and the second outlet port 48c, and the latter chamber 53 being in open communication with the second inlet port 48d. As can be well seen in FIG. 2, the first valve member 49 is formed at its one end with a flat valve part 49a which is exposed in the first chamber 54. The second annular valve member 50 is formed at its one end with a first valve part 50b in the form of an annular projection and at its other end with a second valve part 50c in the form of an annular projection. The first valve part 50b is smaller in diameter than the second valve part 50c. In such arrangement, the first valve part 50b of second valve member 50 cooperates with the flat valve part 49a of first valve member 49 to form a first annular throttle, while the second valve part 50c of valve member 50 cooperates with the inner end wall of first chamber 54 to form a second annular throttle. Assembled further within housing 48 is a compression coil spring 55 which acts to bias the second valve member 50 toward the inner end wall of chamber 54 and to restrict the movement of the second valve member 50 toward the second chamber 53 until a hydraulic power pressure from pump 20 reaches a predetermined value.

Figure 3:
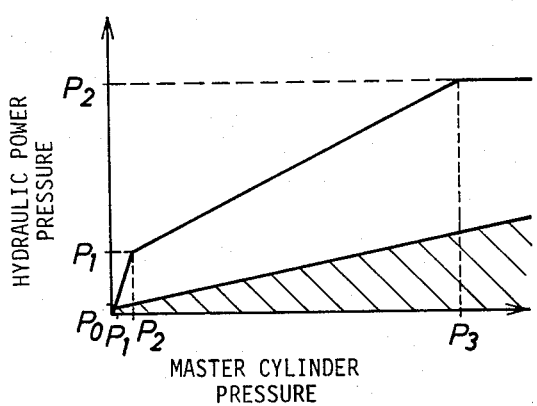
FIG. 3 is a graph indicating the power pressure controlling characteristics of the regulator valve.

In FIG. 3 there is illustrated a hydraulic power pressure controlling characteristics of the regulator valve 22 in relation to the master cylinder pressure. Under inoperative condition of the master cylinder 12, the first valve member 49 is in its rightward stroke end due to a zero value in pressure in the second chamber 53, and the first annular throttle between valve parts 49a and 50b does not act and freely permits the flow of fluid from pump 20 to the power steering device 21 via inlet port 48a, an axial bore 50a of valve member 50, the first annular throttle, and outlet port 48b without causing any resistance to the fluid flow. Thus, the hydraulic power pressure from pump 20 is maintained at a low value or a back pressure $P_0$ caused by a flow resistance in the return circuit between the outlet port 48b and the fluid reservoir 29. When a master cylinder pressure from the master cylinder 12 increases a first predetermined value $P_1$, the first valve member 49 is urged rightwards by the hydraulic power pressure $P_0$. Under such a condition, the pressure acting on piston 49, $P_0 \times A_1$, is equal to the pressure acting on piston 51, $P_1 \times A_2$, where $A_1$ is the left end area of piston 49, and $A_2$ is the right end area of piston 51. While the master cylinder pressure increases over the first predetermined value $P_1$ to a second predetermined value $P_2$, the first valve member 49 displaces leftwards to effect the first annular throttle between valve parts 49a and 50b so as to rapidly increase the hydraulic power pressure to a predetermined value $P_1$. Under such a condition, the ratio of the hydraulic power pressure to the master cylinder pressure is determined by $A_2/A_3$, where $A_3$ is the effective inner area of the first annular throttle, and an equation of $P_1 \times (A_4 - A_3) = F$ is satisfied, where $A_4$ is the effective inner area of the second annular throttle between valve parts 50c and the inner end wall of chamber 54, and F is the initial load of spring 55. When the master cylinder pressure further increases over the second predetermined value $P_2$ to a third predetermined value $P_3$, the second valve member 50 displaces against the biasing force of spring 55 and is brought into engagement with the valve part 49a of piston 49 to close the first annular throttle and to effect the second annular throttle so as to further increase the hydraulic power pressure. Under such a condition, the ratio of the hydraulic power pressure to the master cylinder pressure is determined by $A_1/A_4$. In FIG. 3, a region indicated by cross lines represents a relationship between the hydraulic power pressure and the master cylinder pressure where the bypass valve $V_2$ in anti-skid apparatus 23 is opened in a usual manner to effect the direct fluid flow from the master cylinder to the rear wheel brake cylinders 18, 18.

In the actual practices of the present invention, a conventional proportioning valve may be disposed within the braking circuit 16 between the master cylinder 12 and the anti-skid apparatus 23. In such a case, the regulator valve 22 is arranged to be applied with an output fluid pressure from the proportioning valve. Alternatively, the cut-off valve $V_1$ may be arranged to be closed by another solenoid means in operation of the first differential piston assembly 25.

Having now fully set forth both structure and operation of the preferred embodiment of the concept underlying the present invention, various other embodiments as well as certain variations and modifications of the embodiment herein shown and described will obviously occur to those skilled in the art upon becoming familiar with said underlying concept. It is to understood, therefore, that within the scope of the appended claims, the invention may be practiced otherwise than as specifically set forth herein.

What is claimed is:

1. A regulator valve for a hydraulic anti-skid apparatus for installation in a vehicle braking system between a master cylinder and a wheel brake cylinder, the regulator valve comprising:

a housing provided with first and second inlet ports respectively for connection to a hydraulic power pressure source and said master cylinder and with first and second outlet ports respectively for connection to a fluid reservoir and said anti-skid apparatus;

a first valve member in the form of a piston reciprocable within an axial bore in said housing and subdividing the interior of said housing into a first chamber in open communication with said first inlet and outlet ports and said second outlet port and a second chamber in open communication with said second inlet port, said first valve member being formed at one end thereof with a valve part exposed in said first chamber;

a second annular valve member arranged in said first chamber coaxially with said first valve member, said second valve member being formed at one end thereof with a first valve part in a small diameter cooperating with the valve part of said first valve member to form a first annular throttle for throttling the flow of fluid from said first inlet port to said first outlet port and at the other end thereof with a second valve part in a large diameter cooperating with the inner end wall of said first chamber to form a second annular throttle for throttling the flow of fluid from said first inlet port to said first outlet port after said first throttle is closed; and resilient means for biasing said second annular valve member toward the inner end wall of said first chamber to restrict the movement of said second annular valve member toward said first valve member until a power pressure from said power pressure source reaches a predetermined value.

2. A regulator valve as claimed in claim 1, wherein the valve part of said first valve member is formed with a flat face, and the first and second valve parts of said second annular valve member are respectively formed with an annular projection.

3. A regulator valve as claimed in claim 1, wherein the first outlet port of said housing is arranged to be in connection to said fluid reservoir through a hydraulically operated device.

* * * * *